United States Patent [19]

Singh et al.

[11] Patent Number: 5,314,950
[45] Date of Patent: May 24, 1994

[54] HEAT RESISTANT RESIN COMPOSITION COMPRISING POLYMERS OF N-(SUBSTITUTED) MALEIMIDES AND IMPROVED PROCESS FOR THE PREPARATION OF SAID MALEIMIDES

[75] Inventors: Balwant Singh; Robert J. Tynik, both of Stamford, Conn.

[73] Assignee: Cytec Technology Corp., Wilmington, Del.

[21] Appl. No.: 7,225

[22] Filed: Jan. 22, 1993

[51] Int. Cl.[5] ............... C08L 35/00; C08L 35/06; C08F 222/40; C08F 122/40
[52] U.S. Cl. ............................ 525/73; 525/205; 526/262
[58] Field of Search ............ 525/73, 205; 526/262

[56] References Cited

U.S. PATENT DOCUMENTS 4,111,879  9/1978  Mori .................................. 523/122
5,028,651  7/1991  Park et al. ......................... 524/409

FOREIGN PATENT DOCUMENTS 036442   2/1987  Japan .................................. 525/205
079248   3/1989  Japan .
1533067  11/1978  United Kingdom .

OTHER PUBLICATIONS

Matsumoto "Radial Polymerization of (alkyl substituted phenyl) Maleimides"; Macromolecules 23(21) pp. 4508–4513; Oct. 1990.
Chemical Abstracts 113 (4) 25107e Japanese Patent Publication 02004810 9 Jan. 1990 Mitsunga et al. Manufacture of Maleimide Polymers.
Chemical Abstracts 109 (16) 130219h Japanese Patent Publication 62228865 15 Dec. 1987 Hashimoto et al. Heat Resistant Resin Compositions.
Chemical Abstracts 113 (20) 172952e Japanese Patent Publication 02147610 6 Jun. 1990 Mitsunga et al. Manufacture of Maleimide Polymers.
Chemical Abstracts 114 (15) 138033s Japanese Patent Publication 02240002 25 Sep. 1990 Irigashi et al. N-(Alkylphenyl) Maleimides.
Chemical Abstracts 96 (19) 157434z Japanese Patent Publication 57016804 28 Jan. 1982 Ihara. Chem. Ind. Aralmalemides as antifouling agts.
Chemical Abstracts 112 (01) 4341r Nippon Kagaku Kaishi (9) 1616–9 1989, Igarishi et al. Antimicrobial Maleimide Compounds.

*Primary Examiner*—David Buttner
*Attorney, Agent, or Firm*—Bart E. Lerman; Michael J. Kelly; Claire M. Schultz

[57] ABSTRACT

Novel resin compositions are provided which possess excellent heat resistance and thermal color stability, alone, or in admixture with bulk resins. The claimed resin compositions comprise homo- and/or copolymers of N-(2,3-dimethylphenyl) maleimide, alone, or in further combination with resins composed of copolymer components, such as vinyl copolymers and rubber-grafted-vinyl copolymer resins. The resin compositions have improved heat resistance and produce molded articles with desirably light colors. Also provided is an improved process to make maleimide monomers by using selected polar solvents whereby the amount of uncyclizable trans-amic acid is held at tolerable levels and the desired maleimide is obtained in high yields, free from by-products.

10 Claims, No Drawings

HEAT RESISTANT RESIN COMPOSITION COMPRISING POLYMERS OF N-(SUBSTITUTED) MALEIMIDES AND IMPROVED PROCESS FOR THE PREPARATION OF SAID MALEIMIDES

BACKGROUND OF THE INVENTION

The present invention relates to novel resin compositions and to improved methods to prepare monomers to produce such resins and other valuable compounds. More particularly, it relates to resins derived from N-(substituted) maleimide monomers, the resins having excellent heat resistance, per se, and the ability to enhance heat resistance when mixed with other bulk resins, and to an improved method for the preparation of such maleimide monomers using judiciously selected polar solvents.

A variety of N-alkyl and N-aryl maleimides have been used to improve the heat stability of homo- and especially co-polymers prepared from vinyl monomers. Typically, the bulk resins comprise, ABS (poly-(acrylonitrile-co-butadiene-co-styrene)) or a polyblend of poly-(acrylonitrile-co-butadiene) and poly-(styrene-co-acrylonitrile); PVC (poly(vinyl chloride); SAN (poly(styrene-co-acrylonitrile)); PMMA (poly-(methyl methacrylate)); and the like. The maleimides can be copolymerized with other monomers such as acrylonitrile, butadiene, styrene, methyl methacrylate, vinyl chloride, vinyl acetate, and many other comonomers. A more preferred practice in the industry is to produce copolymers of maleimides with other monomers such as styrene and optionally acrylonitrile and to blend these with ABS and SAN resins. In any event, the polymer compositions are adjusted so that the copolymers are fully compatible with the bulk resins, e.g., ABS and/or SAN) as shown by the presence of a single glass transition point, $T_g$, as determined by differential scanning calorimetry (DSC). Maleimide-containing aromatic vinyl resins prepared by suspension polymerization in the presence of organic peroxides and/or azo compounds, and their use in the manufacture of parts for automobiles, electrical and electronic machinery and appliances, because of their good heat resistance, impact resistance and moldability, are described, for example, in Japanese Patent Publication Nos. J02004810, Jan. 9, 1990; J62288655, Dec. 15, 1987; and J02147610, Jun. 6, 1990; and also in Park, et al., U.S. Pat. No. 5,028,651.

Among the numerous maleimides described in the literature, N-phenylmaleimide (NPMI) appears to be the monomer of choice so far. NPMI shows excellent properties as a material to improve heat resistance. The major drawbacks are its relatively low solubility in common organic solvents, high toxicity and deep yellow color which imparts dark color to the finished molded articles. Thus, related compounds without such drawbacks would be distinctly advantageous. It does not appear that N-(di(lower)alkylphenyl) maleimides, and especially N-(2,3-dimethylphenyl) maleimide, although known, have ever been used commercially in place of NPMI. Furthermore, homopolymers and co-polymers of the known compound N-(2,3-dimethylphenyl) maleimide have never apparently been described although they can be said to have been described generically. That is, the above mentioned Japanese Publications describe the preparation of copolymers of alkyl substituted aryl maleimides, but N-(2,3-dimethylphenyl) maleimide is not included in the list. N-(2,3-dimethylphenyl) maleimide is described for use as an industrial microbiocide and as a human anti-fungal agent in a number of publications, among which are Japanese Patent Publication Nos. J02240002, Sep. 25, 1990; J57016804, Jan. 28, 1982; British Patent No. 1533067, Nov. 22, 1978; and "Nippon Kagaku Kaishi" (9), 1616–19 (1989).

Applicants have now prepared this N-(2,3-dimethylphenyl) maleimide and discovered that it is a pale yellow solid and appears to be less toxic than the phenyl analog (NPMI). It has higher solubility than the phenyl analog; and, surprisingly, its novel homo- and co-polymers are easily compatible with SAN and with other polymers. As an important part of this work, applicants have also discovered an improved process for the preparation of N-(substituted) maleimides, which depends on the use of specific aprotic and protic polar solvents. The non-polar solvent, xylene, seems to have been the solvent of choice until now (see, for example, the above-mentioned Japanese Patent Publication No. J02240002; and GB No. 1533067, both of which use xylene). While not intending to be bound by any theory of operation, it appears that careful selection of the solvent reduces the amount of trans-amic acid formed in the first stage of reaction between maleic anhydride and the amines. Because the cis-isomer is preferentially produced and the trans-isomer does not cyclize, but the cis-isomer does, high yields of the desired maleimide are surprisingly obtained.

SUMMARY OF THE INVENTION

The principal object of the present invention is to provide a heat resistant resin composition possessing improved ultimate color in molded articles.

A further object of the invention is to provide heat resistant resin compositions using less toxic materials than currently employed.

Yet another object of the invention is to provide monomers that homopolymerize and copolymerize to produce heat resistance-elevating materials with higher compatibility with bulk resins, as measured by determining whether or not they dissolve in selected solvents, and by whether or not they have a single glass transition temperature, $T_g$.

Still another object of the invention is to provide SAN- and ABS-compatible resins with higher heat deflection temperatures, and lower color, properties which are important in all kinds of household electric appliances and high precision business machines such as computer monitor housings.

Yet another object of the invention is to provide high yields of pure N-(substituted) maleimides, useful for many purposes, e.g., as microbiocides, but especially to make heat resistant polymer compositions, by reacting maleic anhydride with amines in polar solvents followed by a cyclization step.

In accordance with the present invention, the foregoing objects are achieved by providing a resin composition adapted to form heat resistant, compatible compositions with bulk resins, the resin composition comprising a homopolymer of N-(2,3-dimethylphenyl) maleimide, a copolymer of N-(2,3-dimethylphenyl) maleimide or a mixture thereof. The corresponding N-(3,4-dimethylphenyl) maleimide homo- and co-polymers are also suitable but the N-(2,3-dimethylphenyl) maleimide monomers and polymers are more preferred due to their substantially lower color.

Among the preferred features of the invention are such compositions wherein the homopolymer is polymerized from N-(2,3-dimethylphenyl) maleimide under free-radical or anionic polymerization conditions; those comprising a copolymer polymerized from a monomer mixture comprising N-(2,3-dimethylphenyl) maleimide, preferably those wherein the copolymer is polymerized from a monomer mixture comprising N-(2,3-dimethylphenyl) maleimide under bulk or continuous polymerization conditions; more preferably those wherein the copolymer is prepared by copolymerizing N-(2,3-dimethylphenyl) maleimide with one or more monomers selected from aromatic monoalkenyl monomers, vinyl cyano monomers, alkylester monomers of acrylic acid, alkylester monomers of methacrylic acid, vinyl halide monomers, or vinyl alkylester monomers; especially wherein the copolymer comprises poly-(N-(2,3-dimethylphenyl) maleimide-co-styrene). Also contemplated are compositions as first above defined comprising a graft copolymer prepared by copolymerizing (i) a rubbery polymer, (ii) N-(2,3-dimethylphenyl) maleimide, and (iii) one or more monomers selected from aromatic monoalkenyl monomers, vinyl cyano monomers, alkylester monomers of acrylic acid, alkylester monomers of methacrylic acid, vinyl halide monomers, or vinyl alkylester monomers; and preferably those wherein the rubbery polymer component (i) is selected from butadiene type rubbers, isoprene type rubbers, copolymers of diene monomers and styrene monomers, and alkylacrylate rubbers.

Also contemplated by the invention are heat resistant, compatible resin compositions, the resin composition comprising:

(a) a homopolymer of N-(2,3-dimethylphenyl) maleimide, a copolymer of N-(2,3-dimethylphenyl) maleimide, or a mixture thereof; and (b)(1) a copolymer prepared by copolymerizing one or more monomers selected from aromatic monoalkenyl monomers, vinyl cyano monomers, alkylester monomers of acrylic acid, or alkylester monomers of methacrylic acid, vinyl halide monomers, or vinyl alkylester monomers;

(b)(2) a graft copolymer prepared by copolymerizing (i) a rubbery polymer, (ii) N-(2,3-dimethylphenyl) maleimide, and (iii) one or more monomers selected from aromatic monoalkenyl monomers, vinyl cyano monomers, alkylester monomers of acrylic acid, alkylester monomers of methacrylic acid, vinyl halide monomers, or vinyl alkylester monomers; or (b)(3) a mixture of (b)(1) and (b)(2), wherein said polymer, copolymer or mixed polymer component (a) and said copolymer component (b)(1, 2 or 3) are present in a ratio of 5:95 to 95:5 parts by weight in the resin composition; preferably such compositions wherein the polymer, copolymer or mixed polymer component (a) and the copolymer component (b)(1, 2 or 3) are present in a ratio of 10: 90 to 90: 10 parts by weight in the resin composition; and especially preferably those wherein the polymer, copolymer or mixed polymer component (a) and the copolymer component (b)(1, 2 or 3) are present in a ratio of 15:85 to 85:15 parts by weight in the resin composition. Special mention is made of compositions comprising (a)(1) a homopolymer of N-(2,3-dimethylphenyl)maleimide; and (b)(1) a copolymer of styrene and acrylonitrile and compositions comprising (a)(1) a copolymer comprising poly-(N-(2,3-dimethylphenyl)maleimide-co-styrene); and (b)(1) a copolymer of styrene and acrylonitrile. In all such cases, it is also preferred that such compositions have a single glass transition temperature, $T_9$ as determined by DSC.

In a major aspect, the present invention provides a process for the preparation of N-(substituted) maleimides and bis-maleimides represented by the formulae:

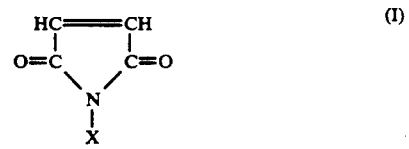

(I)

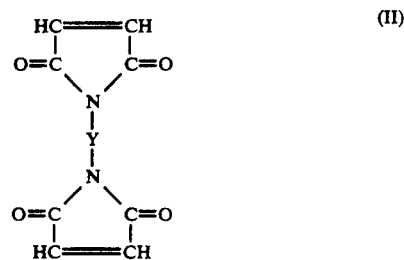

(II)

wherein X represents $C_1-C_{20}$ alkyl, such as methyl, propyl, butyl, octadecyl, dodecyl; cycloalkyl such as cyclohexyl, $C_1-C_6$ alkyl cyclohexyl, dialkyl ($C_1-C_6$) cyclohexyl, such as dimethylcyclohexyl; aryl, such as phenyl, naphthyl, biphenyl; substituted aryl, such as alkyl ($C_1-C_6$) phenyl, dialkyl ($C_1-C_6$) phenyl, hydroxyphenyl, alkoxyphenyl, nitrophenyl, mono-, di-, and trihalophenyl; and where Y represents alkylene, phenylene, biphenylene and their mono- and di alkyl ($C_1-C_6$) and their corresponding ring-hydrogenated derivatives, halo- and nitro- substituted derivatives, their corresponding ring-hydrogenated derivatives, and the grouping

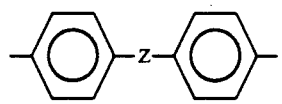

wherein Z represents $C_1-C_3$ alkylene, O, S, $SO_2$, and the grouping

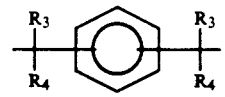

wherein $R_3$ and $R_4$ are $C_1-C_6$ alkyl, said process comprising:

(1) preparing a reaction mixture comprising maleic anhydride, a polar solvent or a mixture of a polar and a non-polar solvents, and, from about 75 mole % to 125 mole % based on the said maleic anhydride per amine equivalent of an amine of the formula (III) for the N-substituted maleimides and a diamine of the formula (IV) for the N-substituted bismaleimides:

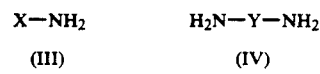

wherein X and Y are as above defined;

(2) maintaining the reaction mixture at a temperature of from about 20° C. to 45° C. until the corresponding cis-maleamic acids of the formulas (V) and (VI):

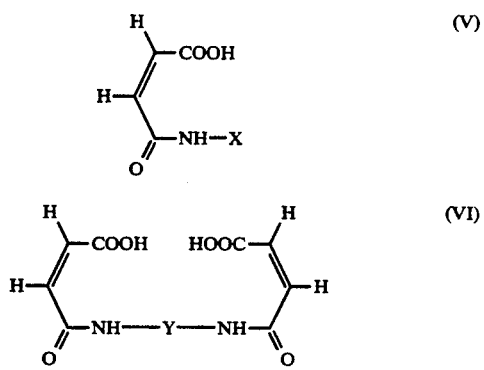

substantially free of the trans-isomers are obtained;

(3) adding a catalytic amount of an acid cyclization catalyst to the mixture of step (2) and, (4) heating the mixture and distilling until removal of water from the mixture is substantially complete leaving a solution containing the compound of the formula (I) or (II), tolerable amounts or less of the uncyclizable by-product trans-acid (trans isomers of (V) and (VI)) and tolerable amounts of maleic anhydride and/or maleic acid.

A preferred feature of this aspect of the invention comprises such a process wherein the polar solvent used for step (1) comprises a protic or aprotic solvent containing 3 to 20 carbon atoms, more preferably 4 to 6 carbon atoms; those wherein the protic or aprotic solvent comprises an alcohol such as t-butanol, t-amyl alcohol, ethylene glycol dimethyl ether or a mixture thereof; and those wherein the acid cyclization catalyst is a sulfonic acid such as p-toluene sulfonic acid, dodecyl benzene sulfonic acid, naphthalene sulfonic acid and the like. Concentrated sulfuric acid, hydrochloric acid, sulfate esters of alcohols and acidic clays are also effective but are less preferred.

Another feature of this aspect of the invention comprises such a process wherein a mixture of polar and higher boiling co-solvent is used for step (1). Such a variation allows removal of water-polar solvent-co-solvent azeotrope leaving substantially pure maleimide as a solution in the higher boiling co-solvent which circumvents the necessity for handling solid product(s). Preferred co-solvents are toluene, xylenes, methyl isobutyl ketone and the like. Removal of excess maleic anhydride, maleic acid, and unreacted maleamic acid intermediates is accomplished by washing the solution with an aqueous base such as sodium carbonate, followed by water, and subsequently drying the solution under azeotropic removal of water.

In a further variation of the above process, steps (1) and (2) are both conducted in a polar solvent such as t-butanol, t-amyl alcohol or ethylene glycol dimethyl ether as disclosed above. Following removal of water and most of the polar solvent, a co-solvent such as toluene, xylene, or MIBK, is added. Following removal of the polar solvent-co-solvent azeotrope, maleimide is obtained as a solution in the co-solvent. This and the above variations are particularly suited for producing alkyl and dialkyl substituted phenyl maleimides and bismaleimides.

DETAILED DESCRIPTION OF THE INVENTION

The process of the present invention produces N-(substituted) maleimides and bis-maleimides from maleic anhydride and amines and diamines, and is particularly suited for the preparation of aryl, alkyl, cycloalkyl, and their substituted derivatives, especially those carrying alkyl substituents. When used herein and in the appended claims, the alkyl substituents can be straight chain or branched, and may include, independently, methyl, ethyl, n-propyl, i-propyl, n-butyl, t-butyl, n-pentyl, 2-methylpentyl, n-hexyl, and the like. By way of illustration, 2,3-dimethyl aniline is reacted with maleic anhydride in protic or aprotic polar solvents, such as t-butanol, t-amyl alcohol and ethylene glycol dimethyl ether (glyme) preferably those having from 4 to 20 carbon atoms. Not all such solvents will give the highest yields, however. As will be shown in the comparative examples hereinafter, 2-propanol and 2-butanol, although similar, result in extended reaction times and lower yields. In any event, the process is carried out by forming a reaction mixture by dissolving maleic anhydride in the selected solvent and adding the substituted aniline at a moderate temperature, even at room temperature, during which the intermediate maleamic acid forms and remains in solution. Then an acid catalyst, e.g., p-toluenesulfonic acid, is added, and ring closure is effected by heating for a suitable period of time. The water by-product is removed by azeotropic distillation in known ways. If desired, the distillate is continuously dried with molecular sieves and returned to the reaction flask. The product can be recovered in known ways. One especially convenient method comprises removing the solvent, dissolving the product in a water-immiscible solvent, such as chloroform, washing first with aqueous base, such as sodium carbonate, and then with acid, such as dilute hydrochloric acid. Evaporation of the solvent leaves the desired monomer, which, in the case of N-(2,3-dimethylphenyl) maleimide, is a pale yellow to off-white crystalline solid. Detailed procedures will be set forth in the working examples, which follow.

The compositions of the present invention relating to heat resistant resins are made by polymerization procedures well known to those skilled in this art. They will be described in the working examples which follow.

The homo- and co-polymers of the N-(2,3-dimethylphenyl) maleimide can be prepared by bulk, solution, suspension, and emulsion polymerization either in batch or continuous processing, using catalytic systems such as free-radical generating peroxides or azo-containing catalysts, or redox systems, anionic catalysts, and the like. The maleimides can be used alone, which produces the corresponding homopolymers, or they can be mixed with a copolymerizable monomer such as styrene, alpha-methylstyrene, acrylonitrile, methacrylonitrile, vinyl chloride, vinylidene chloride, methyl methacrylate, methyl acrylate, 2-ethylhexyl methacrylate, and the like. Copolymerization in the presence of a rubbery copolymer, such as polybutadiene, polyisoprene, styrene-co-butadiene, and the like, in known ways produces the rubbery graft copolymers used to provide certain compositions of the invention. The rubbers are preferably used in an amount of 5 to 70% by weight, more preferably 10 to 60% by weight, of the graft copolymer, and preferably they have a particle diameter of 0.1 to 1.5 micrometers, more preferably 0.2 to 0.9 micrometers.

In any event, all of these techniques are well known by reference to all of the literature using N-phenyl maleimide for the same purpose, namely, to provide polymer compositions with enhanced heat resistance. So too, it would be unnecessarily repetitive to set forth herein details of compounding and molding of the instant compositions, in view of the voluminous literature on the use of N-phenyl maleimide compositions and the detailed examples which follow.

The heat resistant and flame retardant resin composition may comprise additives in addition to previously stated components, such as flame retardant agents, synergists for the flame retardant agents, drip retardant agents, pigments, dyes, heat stabilizers, antioxidants, plasticizers, lubricants, UV-stabilizers, processing aids, foaming agents, and the like in order to further improve the properties, including processability, of the resin compositions.

If used, an organic flame retardant typically includes aromatic compounds containing halogens such as 1,2-bis(2,4,6-tribromophenoxy)ethane, decabromodiphenyl oxide and octabromodiphenyl oxide, or mixtures thereof, aliphatic compounds containing halogens such as 2,2-bis(3,5-dichlorophenyl)propane and bis(2,6-dibromophenyl) methane, and cycloaliphatic compounds containing halogens such as bis(3,5-dichlorophenyl) cyclohexylmethane. Aromatic compounds are preferably used. The amount of the organic flame retardant preferably used is 5 to 40% by weight, more preferably 10 to 30% by weight, of the total amount of the resin composition. When the amount of organic flame retardant is less than 5% by weight of the total amount of the resin composition, sufficient flame retardance cannot be obtained. When the amount of organic flame retardant is over 40% by weight, not only does the organic flame retardant tend to sharply decrease the properties of the resin composition, but the manufacturing process also becomes too costly. As to synergists, if antimony trioxide is used in the compositions of the present invention, it will be present in an amount of 1 to 20% by weight, preferably 1 to 15% by weight, of the total weight of the resin composition. When the amount of antimony trioxide is less than 1% by weight of the total weight of the resin composition, sufficient flame retardance cannot be obtained because synergism of antimony trioxide with the organic flame retardant does not occur. When the amount of antimony trioxide is over 20% by weight, the impact strength of the resin composition decreases to an undesirable level.

DESCRIPTION OF THE PREFERRED EMBODIMENTS

This invention is further illustrated, but is not intended to be limited, by the following examples in which all parts are by weight.

EXAMPLE 1

Preparation of N-(2,3-dimethyl phenyl) Maleimide Using t-Butanol as a Solvent

In a suitable reaction vessel, 10.0 parts of maleic anhydride is partially dissolved in 78.6 parts of t-butanol and then treated at room temperature with 12.1 parts of 2,3-dimethylaniline dissolved in 15.7 parts of t-butanol. The intermediate maleamic acid is not isolated. One and nine-tenths parts of p-toluenesulfonic acid is then added and ring closure (imidization) is effected by heating for 19 hours at 83° C. When the reaction is complete, the solvent is removed and the product is dissolved in chloroform. The product solution is first washed with aqueous sodium carbonate and then with dilute hydrochloric acid. Finally, the solvent is removed leaving 16.1 parts (80%) of a light-beige, crystalline solid.

COMPARATIVE EXAMPLES 1A*-4A*

The procedure of Example 1 is repeated substituting, respectively, the following solvents: methanol, ethanol, 2-propanol, and 2-butanol. The results obtained and the reaction parameters are set forth in Table I, as follows:

TABLE I

| Example | Solvent | Temperature,°C. | Yield, % |
|---|---|---|---|
| 1A* | methanol | 65 | 18 |
| 2A* | ethanol | 78 | 34 |
| 3A* | 2-propanol | 83 | 69 |
| 4A* | 2-butanol | 83 | 65 |

EXAMPLE 2

Preparation of N-(2,3-dimethyl phenyl) Maleimide Using t-Butanol as a Solvent and Using 3A Molecular Sieves to Remove the Water Byproduct The procedure of Example 1 is repeated with the following changes: The maleic anhydride is partially dissolved in 118 parts of t-butanol, the water byproduct formed during imidization is removed as an azeotrope, and the solvent is continuously dried with 3A molecular sieves and returned to the reaction vessel during an 18 hour reaction period. Seventeen and six-tenths parts (88%) of product is obtained as a pale-yellow, crystalline solid.

EXAMPLE 3

Preparation of N-(2,3-dimethyl phenyl) Maleimide Using Diethylene Glycol Dimethyl Ether (glyme) as a Solvent The procedure of Example 2 is repeated with the following changes: twenty parts of maleic anhydride partially dissolved in 86.7 parts of ethylene glycol dimethyl ether, 24.2 parts of 2,3-dimethylaniline dissolved in 21.7 parts of ethylene glycol dimethyl ether, and 3.80 parts of p-toluenesulfonic acid are used. Thirty four and nine-tenths parts (87%) of product is obtained as a beige, crystalline solid.

EXAMPLE 4

Preparation of N-(2,3-dimethylphenyl) Maleimide Using t-Amyl Alcohol as a Solvent In a suitable reaction vessel, 10.8 parts of maleic anhydride is partially dissolved in 121 parts of t-amyl alcohol and then treated at room temperature with 12.1 parts of 2,3-dimethylaniline dissolved in 16.1 parts of t-amyl alcohol. The intermediate maleamic acid is not isolated. One and nine-tenths parts of p-toluenesulfonic acid is then added and ring closure (imidization) is effected by distilling 100 ml of liquid to remove the water byproduct as an azeotrope. When the reaction is complete, the remaining solvent is removed and the product is dissolved in chloroform. The product solution is first washed with aqueous sodium carbonate and then with dilute hydrochloric acid. Finally, the solvent is removed, leaving 18.1 parts (90%) of a pale-yellow crystalline solid.

EXAMPLE 5

Preparation of N-(2,3-dimethylphenyl) Maleimide Using t-Amyl Alcohol and Toluene as a Solvent Mixture In a suitable reaction vessel, 10.8 parts of maleic anhydride is partially dissolved in a mixed solvent composed of 121 parts of t-amyl alcohol and 43 parts of toluene. The solution is treated dropwise with 12.1 parts of 2,3-dimethylaniline dissolved in 16 parts of the same mixed solvent. After the addition is complete, 1.90 parts of p-toluenesulfonic acid is then added and the solution is heated at reflux for four hours. The water byproduct is collected in a Dean-Stark trap. The solution is then allowed to cool to room temperature and the solvents are removed by rotary evaporation. The crude product is dissolved in toluene, and washed first with aqueous sodium carbonate and then with dilute hydrochloric acid. The toluene solution is dried over anhydrous magnesium sulfate, filtered, and rotary evaporated leaving 18.6 parts (93%) of off-white solid.

With respect to Comparative Examples 1A*-4A*, the yields are decidedly lower than those obtained in Examples 1 and 2, which used t-butanol and 3, which used diethylene glycol dimethyl ether, and 4 and 5, which used t-amyl alcohol, alone, and in admixture with the aprotic solvent toluene, in accordance with the present invention.

EXAMPLES 6-13

If the procedure of Example 5 is repeated substituting the following named dialkylanilines, the following listed N-(di(lower)alkylphenyl) maleimides will be obtained in improved yield:

| Reactant Aniline | Maleimide Product |
|---|---|
| 2,4-dimethylaniline | N-(2,4-dimethylphenyl) maleimide |
| 2,5-dimethylaniline | N-(2,5-dimethylphenyl) maleimide |
| 3,4-dimethylaniline | N-(3,4-dimethylphenyl) maleimide |
| 3,5-dimethylaniline | N-(3,5-dimethylphenyl) maleimide |
| 2,6-dimethylaniline | N-(2,6-dimethylphenyl) maleimide |
| 2,3-diethylaniline | N-(2,3-dimethylphenyl) maleimide |
| 2-methyl-3-propyl-aniline | N-(2-methyl-3-propylphenyl) maleimide |
| 2,3-dihexylaniline | N-(2,3-dihexylphenyl) maleimide |

EXAMPLES 14, 15 AND COMPARATIVE EXAMPLE 14A* Preparation of Poly-(N-(2,3-dimethylphenyl) Maleimide) (Free-radical Homopolymerization)

The monomer prepared in accordance with the procedure of Example 5 is polymerized in the presence of a free-radical-generating catalyst as follows: A solution of 40.2 parts of N-(2,3-dimethylphenyl) maleimide in 173 parts of toluene and a solution of 0.33 part of azobis-isobutyronitrile (AIBN) in 17 parts of toluene is sparged with nitrogen gas for 30 minutes. The monomer solution is heated to 60° C. and the AIBN solution is then rapidly added. The solution is stirred at 75°-80° C. for 18 hours under nitrogen, allowed to cool to room temperature, and poured as a fine stream into 1582 parts of rapidly-stirred methanol. The polymer is separated by suction filtration, washed with methanol on the filter, and dried giving 19.5 parts (49%) of light-yellow solid. The properties of the homopolymer (Example 14) are set forth in Table II, which follows.

Preparation of Poly(N-(2,3-dimethylphenyl) maleimide) by Anionic Polymerization

The monomer prepared in accordance with the procedure of Example 5 is polymerized in the presence of an anionic catalyst as follows: A solution of 10.1 parts of N-(2,3-dimethylphenyl) maleimide dissolved in 88.6 parts of tetrahydrofuran (THF) is sparged with nitrogen gas for 15 minutes. The solution is then cooled to −72° C. in an ethanol-dry ice bath, treated with 0.20 part of potassium t-butoxide, and stirred f or 2 hours under nitrogen. The solution is then acidified with hydrochloric acid, allowed to warm to room temperature, and poured as a fine stream into 791 parts of rapidly-stirred methanol. The polymer is separated by suction filtration, washed on the filter, first with methanol, and then with water, and dried giving 9.85 parts (98%) of white solid. The properties of the homopolymer (Example 15) are set forth in Table II, which follows.

Preparation of Poly(N-phenyl maleimide) by Radical Polymerization

The monomer prepared in accordance with the procedure of Example 5, but substituting aniline for 2,3-dimethylaniline, is polymerized in the presence of a free-radical-generating catalyst as follows: The procedure of Example 12 is repeated with the following changes: Seventeen and three-tenths parts of N-phenyl-maleimide dissolved in 130 parts of toluene and 0. 17 part of AIBN dissolved in 13 parts of toluene are used, and the reaction mixture is stirred at 60° C. for 18 hours. The polymer precipitates out of solution during heating and is separated form the reaction mixture by suction filtration. It is washed on the filter with methanol and dried giving 17.2 parts (99%) of white solid. The properties of the homopolymer (Example 14A*) are set forth in Table II, which follows.

TABLE II

PROPERTIES OF HOMOPOLYMERS

| EXAMPLE | POLYMER | $M_w$ | $M_w/M_n$ | $T_g$, °C. | Color | SOLUBILITY | | | | | |
|---|---|---|---|---|---|---|---|---|---|---|---|
| | | | | | | Tol | Ace | DMF | THF | Chl | Sty |
| 14 | Poly-(N-(2,3-dimethyl-phenyl) maleimide) | 6,500 | 1.81 | — | pale yellow | S | S | S | S | S | S |
| 15 | Poly-(N-(2,3-dimethyl-phenyl) maleimide) | 61,600 | 2.77 | — | white | S | S | S | S | S | S |
| 14A* | Poly-(N-phenyl | — | — | — | white | I | I | S | I | I | I |

TABLE II-continued

PROPERTIES OF HOMOPOLYMERS

| EXAMPLE | POLYMER | $M_w$ | $M_w/M_n$ | $T_g$, °C. | Color | SOLUBILITY | | | | | |
|---|---|---|---|---|---|---|---|---|---|---|---|
| | | | | | | Tol | Ace | DMF | THF | Chl | Sty |
| | maleimide) | | | | | | | | | | |

TOL = Toluene;
Ace = Acetone;
DMF = Dimethylformamide;
Chl = Chloroform;
Sty = Styrene;
THF = tetrahydrofuran
S = soluble;
PS = partly soluble;
I = Insoluble The data in Table II indicate that the maleimide-containing homopolymer compositions of the present invention, Examples 14 and 15, are more soluble in common organic solvents than is the current commercial product of choice, Example 14*.

EXAMPLES 16, 17 AND COMPARATIVE EXAMPLES 16A* AND 17A*

Preparation of Poly-(N-(2,3-dimethylphenyl) Maleimide-co-Styrene) (50/50) (Batch Copolymerization)

The monomer prepared in accordance with the procedure of Example 5 is copolymerized with styrene monomer in a batch process as follows: A solution of 10.4 parts of styrene and 20.1 parts of N-(2,3-dimethylphenyl) maleimide in 173 parts of toluene and a solution of 0.20 part of AIBN in 13 parts of toluene is sparged with nitrogen gas for 30 minutes. The solution of monomers is heated to 60° C. and then the AIBN solution is rapidly added. The reaction mixture is stirred at 60° C. for 18.5 hours under nitrogen. The copolymer solution is allowed to cool to room temperature and poured as a fine stream into 1582 parts of rapidly-stirred methanol. The copolymer is separated by suction filtration and dried. The copolymer is redissolved in 158 parts of acetone and added dropwise to 1187 parts of rapidly-stirred methanol. The copolymer is again separated by suction filtration, washed on the filter with methanol and dried giving 30.2 parts (99%) of white solid. The properties of the copolymer (Example 16) are set forth in Table III, which follows.

Preparation of Poly(N-(2,3-dimethylphenyl) maleimide-co-styrene)(50/50)(Continuous Polymerization)

The monomer prepared in accordance with the procedure of Example 5 is copolymerized with styrene monomer in a continuous process as follows: A solution of 5.21 parts of styrene, 0.17 part of AIBN, and 10.1 parts of N-(2,3-dimethylphenyl) maleimide dissolved in 86.7 parts of toluene is sparged with nitrogen gas for 30 minutes. This solution is added dropwise to 43 parts of stirred toluene heated to 75° C. under nitrogen. The temperature is maintained at 75° C. during the addition and for one hour after the addition is complete. The solution is then allowed to cool to room temperature and poured as a fine stream into 1187 parts of rapidly-stirred methanol. The copolymer is separated by suction filtration, washed with methanol on the filter, and dried, giving 12.4 parts (81%) of white solid. The properties of the copolymer (Example 17) are set forth in Table III, which follows.

Preparation of Poly(N-phenyl maleimide-co-styrene)(50/50) (Batch Polymerization)

The monomer prepared with aniline in accordance with the procedure of Example 5 is copolymerized with styrene monomer in a batch process as follows: A solution of 10.4 parts of styrene and 17.3 parts of N-phenyl maleimide dissolved in 607 parts of toluene and a solution of 0. 16 part of AIBN dissolved in 43 parts of toluene is sparged with nitrogen gas for 30 minutes. The solution of monomers is heated to 50° C. and then the AIBN solution is rapidly added with stirring. The reaction mixture is stirred at 55°-60° C. for 20 hours under nitrogen. The copolymer precipitates out of solution during heating and is separated from the reaction mixture by suction filtration. The copolymer is washed on the filter with methanol and dried giving 26.3 parts (95%) of white solid. The properties of the copolymer (Example 16A*) are set forth in Table III, which follows.

For comparison purposes a commercial sample of styrene/acrylonitrile (SAN) from Monsanto Co. is designated Comparative Example 17A*. The properties of this copolymer are also set forth in Table III, which follows.

TABLE III

PROPERTIES OF COPOLYMERS

| EXAMPLE | POLYMER | $M_w$ | $M_w/M_n$ | $T_g$, °C. | Color | SOLUBILITY | | | | | |
|---|---|---|---|---|---|---|---|---|---|---|---|
| | | | | | | Tol | Ace | DMF | THF | Chl | Sty |
| 17A* | Poly-(styrene-co-acrylonitrile) | 188,400 | 2.48 | 105 | colorless | S | S | S | S | S | S |
| 16 | Poly-(N-(2,6-dimethylphenyl) maleimide-co-styrene) | 152,700 | 2.84 | 229 | off-white | PS | S | S | S | S | S |
| 17 | Poly-(N-(2,6-dimethylphenyl) maleimide-co-styrene) | 69,390 | 2.41 | 231 | white | S | S | S | S | S | S |
| 16A* | Poly-(N-phenyl | 122,900 | 2.64 | 225 | white | I | PS | S | S | S | I |

TABLE III-continued

PROPERTIES OF COPOLYMERS

| EXAMPLE | POLYMER | $M_w$ | $M_w/M_n$ | $T_g$, °C. | Color | SOLUBILITY | | | | | |
|---|---|---|---|---|---|---|---|---|---|---|---|
| | | | | | | Tol | Ace | DMF | THF | Chl | Sty |
| | maleimide-co-styrene) | | | | | | | | | | |

TOL = Toluene;
Ace = Acetone;
DMF = Dimethylformamide;
Chl = Chloroform;
Sty = Styrene;
THF = tetrahydrofuran
S = soluble;
PS = partly soluble;
I = Insoluble The data in Table III indicate that the maleimide-containing copolymer compositions of the present invention, Examples 16 and 17, are more soluble in common organic solvents than is the current commercial product of choice, Example 16A*, and further that they should be more compatible with the commercial SAN copolymer, Example 17A*, when used therewith to form heat resistant compositions in accordance with the present invention.

EXAMPLES 18, 19 AND 20 AND COMPARATIVE EXAMPLES 19A* AND 20A*

Preparation of a Blend of Poly-(N-(2,3-dimethylphenyl) Maleimide) and Poly-(Styrene-co-Acrylonitrile) (25/75)

The homopolymer prepared in accordance with the procedure of Example 15 and the SAN copolymer of Comparative Example 17A* are both dissolved in DMF and/or acetone. This solution is added dropwise to methanol and the precipitated blend is separated by suction filtration and dried. The glass transition temperature ($T_g$ is determined by differential scanning calorimetry (DSC). The properties of the blended copolymer composition (Example 18) are set forth in Table IV, which follows.

Preparation of a Blend of Poly-(N-(2,3-dimethylphenyl) Maleimide) and Poly-(Styrene-co-Acrylonitrile) (50/50)

The homopolymer prepared in accordance with the procedure of Example 15 and the SAN copolymer of Comparative Example 17A* are blended in accordance with the procedure of Example 18. The glass transition temperature is determined by the same method as used in Example 18. The properties of the blended copolymer composition (Example 19) are set forth in Table IV, which follows.

Preparation of a Blend of Poly-(N-Phenyl Maleimide) and Poly-(Styrene-co-Acrylonitrile) (50/50)

The homopolymer prepared in accordance with the procedure of Example 14A*, substituting aniline for 2,3-dimethyl aniline, and the SAN copolymer of Comparative Example 17A* are blended in accordance with the procedure of Example 18. The glass transition temperature is determined by the same method as used in Example 18. The properties of the blended copolymer composition (Example 9A*) are set forth in Table IV, which follows.

Preparation of a Blend of Poly-(N-(2,3-dimethylphenyl) Maleimide-co-Styrene) and Poly-(Styrene-co-Acrylonitrile) (50/50)

The copolymer prepared in accordance with the procedure of Example 16 and the SAN copolymer of Comparative Example 17A* are blended in accordance with the procedure of Example 18. The glass transition temperature is determined by the same method used in Example 18. The properties of the blended copolymer composition (Example 20) are set forth in Table IV, which follows.

Preparation of a Blend of Poly(N-Phenyl maleimide-co-styrene)/Poly(styrene-co-acrylonitrile)(50/50)

The copolymer prepared in accordance with the procedure of Example 16A* and the SAN copolymer of Comparative Example 17A* are blended in accordance with the procedure of Example 18. The glass transition temperature is determined by the same method used in Example 18. The properties of the blended copolymer composition (Example 10A*) are set forth in Table IV, which follows.

TABLE IV

PROPERTIES OF HOMOPOLYMER AND COPOLYMER BLENDS

| EXAMPLE | POLYMER | $T_g$, °C. | Color | SOLUBILITY | | | | | |
|---|---|---|---|---|---|---|---|---|---|
| | | | | Tol | Ace | DMF | THF | Chl | Sty |
| 17A* | Poly-(styrene-co-acrylonitrile) | 105 | colorless | S | S | S | S | S | S |
| 18 | Poly-(N-(2,3-dimethylphenyl) maleimide)/Poly(styrene-co-acrylonitrile) (25/75) | 110 | white | PS | S | S | S | S | S |
| 19 | Poly-(N-(2,3-dimethylphenyl) maleimide)/Poly(styrene-co-acrylonitrile) (50/50) | 116 | white | PS | S | S | S | S | S |
| 19A* | Poly-(N-Phenyl maleimide)/Poly(styrene-co-acrylonitrile) (50/50) | 114 | white | PS | PS | S | PS | PS | PS |
| 20 | Poly-(N-(2,3-dimethyl- | 135 | white | PS | S | S | S | S | S |

TABLE IV-continued
PROPERTIES OF HOMOPOLYMER AND COPOLYMER BLENDS

| EXAMPLE | POLYMER | $T_g$, °C. | Color | SOLUBILITY | | | | | |
|---|---|---|---|---|---|---|---|---|---|
| | | | | Tol | Ace | DMF | THF | Chl | Sty |
| 20A* | phenyl) maleimide-co-styrene/Poly(styrene-co-acrylonitrile) (50/50) Poly-(N-phenylmaleimide-co-styrene)/Poly-(styrene-co-acrylonitrile) (50/50) | 148 | white | PS | PS | S | S | S | PS |

TOL = Toluene;
Ace = Acetone;
DMF = Dimethylformamide;
Chl = Chloroform;
Sty = Styrene;
THF = tetrahydrofuran
S = soluble;
PS = partly soluble;
I = Insoluble The data in Table IV indicate that the blended maleimide-containing homo- and co-polymer compositions of the present invention, Examples 18–20, are more soluble in common organic solvents than those containing the current commercial product of choice, Example 19A* and 20A*, and further that they are more compatible with the commercial SAN copolymer when used therewith to form heat resistant compositions in accordance with the present invention.

EXAMPLE 20

Preparation of Graft Copolymer From N-(2,3-dimethylphenyl) Maleimide, Butadiene, Styrene and Acrylonitrile A polybutadiene latex is prepared, e.g., by following the procedure of Park, et al., U.S. Pat. No. 5,028,651, in which 100 parts of butadiene, 120 parts of demineralized water, 0.2 parts of sodium laurylsulfate and 0.2 parts of t-dodecyl mercaptan are added into a batch reactor. At 70° C., 0.1 part of potassium persulfate is added therein to polymerize for 9 hours. As a result, polybutadiene latex was obtained.

If, to 50 parts of the resulting polybutadiene latex (solids content), 200 parts of demineralized water, 30 parts of styrene, 10 parts of acrylonitrile, 10 parts of N-(2,3-dimethylphenyl) maleimide, 0.3 parts of sodium laurylsulfate and 0.2 parts of t-dodecyl mercaptan are added in another reactor. And, if, at 70° C., 0.1 part of potassium persulfate is added therein to polymerize for 3 hours, and, if the resulting graft copolymer is passed through a post-treatment to form dry powders, there will be formed a copolymer within the scope of the present invention. The copolymer thus formed will be useful to provide heat resistant polymer compositions which are not highly colored.

EXAMPLE 21

Preparation of Bis-N,N'-(2,3-dimethyl-1,4-phenylene) Maleimide Using t-Butanol as a Solvent If, in a suitable reaction vessel, 10.0 parts of maleic anhydride is partially dissolved in 78.6 parts of t-butanol and then treated at room temperature with 6.8 parts of 1,4-diamino-2,3-dimethylbenzene dissolved in 15.7 parts of t-butanol, and if 1.9 parts of p-toluenesulfonic acid is then added and ring closure (bis-imidization) is effected by heating for 19 hours at 83° C., and if when the reaction is complete, the solvent is removed and the corresponding product is dissolved in chloroform, and if the product solution is first washed with aqueous sodium carbonate and then with dilute hydrochloric acid, and if, finally, the solvent is removed, there will be left a high yield of the desired product in accordance with the present invention. The patents, publications, and test methods cited above are incorporated herein by reference.

Many variations of the present invention will suggest themselves to those skilled in this art in light of the above, detailed description. All such obvious variations are within the full intended scope of the appended claims.

We claim:

1. A heat resistant, compatible resin composition comprising:
    (a) a homopolymer of N-(2,3-dimethylphenyl)maleimide; and
    (b1) a copolymer prepared by copolymerizing one or more monomers selected from the group consisting of aromatic monoalkenyl monomers, vinyl cyano monomers, alkylester monomers of acrylic acid, alkylester monomers of methacrylic acid, vinyl halide monomers and vinyl alkylester monomers
    (b2) a graft copolymer prepared by copolymerizing (i) a rubbery polymer, (ii) N-(2,3-dimethylphenyl) maleimide, and (iii) one or more monomers selected from the group consisting of aromatic monoalkenyl monomers, vinyl cyano monomers, alkylester monomers of acrylic acid, alkylester monomers of methacrylic acid, vinyl halide monomers and vinyl alkylester monomers; or
    (b3) a mixture of (b1) and (b2),
wherein said homopolymer component (a) and said copolymer component (b) (1, 2 or 3) are present in a ratio of 5:95 to 95:5 parts by weight in the resin composition.

2. A composition as defined in claim 1 wherein said homopolymer component (a) and said copolymer component (b) (1,2 or 3) are present in a ratio of 10:90 to 90:10 parts by weight in the resin composition.

3. A composition as defined in claim 2 wherein said homopolymer component (a) and said copolymer component (b) (1,2 or 3) are present in a ratio of 15:85 to 85:15 parts by weight in the resin composition.

4. A composition as defined in claim 1 having a single glass transition temperature, Tg, as determined by DSC.

5. A composition as defined in claim 1 comprising (a) a homopolymer of N-(2,3-dimethylphenyl) maleimide; and (b1) a copolymer of styrene and acrylonitrile.

6. A heat resistant, compatible resin composition comprising:

(a1) a copolymer comprising poly-(N-(2,3-dimethylphenyl)maleimide-co-styrene); and (b1) a copolymer prepared by copolymerizing one or more monomers selected from the group consisting of aromatic monoalkenyl monomers, vinyl cyano monomers, alkylester monomers of acrylic acid, alkylester monomers of methacrylic acid, vinyl halide monomers and vinyl alkylester monomers;

(b2) a graft copolymer prepared by copolymerizing (i) a rubbery polymer, (ii) N-(2,3-dimethylphenyl) maleimide, and (iii) one or more monomers selected from the group consisting of aromatic monoalkenyl monomers, vinyl cyano monomers, alkylester monomers of acrylic acid, alkylester monomers of methacrylic acid, vinyl halide monomers and vinyl alkylester monomers; or (b3) a mixture of (b1) and (b2), wherein said copolymer component (a1) and said copolymer component (b) (1,2 or 3) are present in a ratio of 5:95 to 95:5 parts by weight in the resin composition.

7. A composition as defined in claim 6 wherein said copolymer component (a1) and said copolymer component (b) (1,2 or 3) are present in a ratio of 10:90 to 90:10 parts by weight in the resin composition.

8. A composition as defined in claim 7 wherein said copolymer component (a1) and said copolymer component (b) (1,2 or 3) are present in a ratio of 15:85 to 85:15 parts by weight in the resin composition.

9. A composition as defined in claim 6 having a single glass transition temperature, Tg, as determined by DSC.

10. A composition as defined in claim 6 comprising (a1) a copolymer comprising poly-(N-(2,3-dimethylphenyl)maleimide-co-styrene); and (b1) a copolymer of styrene and acrylonitrile.

* * * * *